United States Patent
Yadollahi et al.

(12)

(10) Patent No.: US 11,708,709 B2
(45) Date of Patent: Jul. 25, 2023

(54) PYROTECHNIC LATCH ACTUATOR RESPONSIVE TO A DECOMPRESSION DETECTION SYSTEM AND METHOD

(71) Applicant: Adams Rite Aerospace, Inc., Fullerton, CA (US)

(72) Inventors: Morteza Yadollahi, Fullerton, CA (US); Marek Brzeski, Fullerton, CA (US)

(73) Assignee: Adams Rite Aerospace, Inc., Fullerton, CA (US)

( * ) Notice: Subject to any disclaimer, the term of this patent is extended or adjusted under 35 U.S.C. 154(b) by 1091 days.

(21) Appl. No.: 16/414,933

(22) Filed: May 17, 2019

(65) Prior Publication Data

US 2019/0352946 A1 Nov. 21, 2019

Related U.S. Application Data

(60) Provisional application No. 62/681,536, filed on Jun. 6, 2018, provisional application No. 62/681,541, filed
(Continued)

(51) Int. Cl.
*E05B 81/02* (2014.01)
*B64C 1/14* (2006.01)
(Continued)

(52) U.S. Cl.
CPC ............ *E05B 81/02* (2013.01); *B64C 1/1469* (2013.01); *E05B 51/023* (2013.01); *E05B 77/54* (2013.01);
(Continued)

(58) Field of Classification Search
CPC .......... E05B 81/02; E05B 81/04; E05B 81/56; E05B 81/64; E05B 77/54; E05B 85/02;
(Continued)

(56) References Cited

U.S. PATENT DOCUMENTS

| 6,902,137 B2 * | 6/2005 | Brzeski ................. E05B 51/023 292/201 |
| 2003/0173458 A1 | 9/2003 | Bandy et al. |

(Continued)

FOREIGN PATENT DOCUMENTS

| EP | 2878915 A1 | 6/2015 |
| WO | 8401404 A1 | 4/1984 |

(Continued)

OTHER PUBLICATIONS

International Search Report and Written Opinion issued in PCT/US19/32821, dated Aug. 2, 2019.

*Primary Examiner* — Christine M Mills
*Assistant Examiner* — Christopher F Callahan
(74) *Attorney, Agent, or Firm* — BakerHostetler

(57) ABSTRACT

A system for monitoring a pressure change within at least one compartment of an aircraft and operating a pyrotechnic device associated with a door latch, includes a securing mechanism arranged in an aircraft door that includes a pyrotechnic actuator and a latch bolt. The system includes the pyrotechnic actuator configured to move the latch bolt when the pyrotechnic actuator is actuated. The system also includes a pressure sensor configured to provide a pressure signal. The system also includes a controller configured to determine a pressure drop representing a decompression event. The system also includes an output driver configured to generate an output signal to actuate the pyrotechnic actuator when the controller determines the occurrence of a decompression event.

14 Claims, 9 Drawing Sheets

Related U.S. Application Data on Jun. 6, 2018, provisional application No. 62/673,083, filed on May 17, 2018.

(51) Int. Cl.

| | | |
|---|---|---|
| *E05B 77/54* | (2014.01) | |
| *E05B 81/64* | (2014.01) | |
| *E05B 85/02* | (2014.01) | |
| *E05B 85/22* | (2014.01) | |
| *E05B 81/04* | (2014.01) | |
| *E05B 81/56* | (2014.01) | |
| *E05B 51/02* | (2006.01) | |
| *E05C 1/04* | (2006.01) | |

(52) U.S. Cl.
CPC ............. *E05B 81/04* (2013.01); *E05B 81/56* (2013.01); *E05B 81/64* (2013.01); *E05B 85/02* (2013.01); *E05B 85/22* (2013.01); *E05C 1/04* (2013.01); *E05Y 2900/502* (2013.01)

(58) Field of Classification Search
CPC ........ E05B 85/22; E05B 51/02; E05B 51/023; E05B 15/04; E05B 15/101; B64C 1/1469; E05C 1/00; E05C 1/04; E05C 1/08
See application file for complete search history.

(56) References Cited

U.S. PATENT DOCUMENTS

| | | |
|---|---|---|
| 2004/0239126 A1 | 12/2004 | Pratt et al. |
| 2006/0010769 A1 | 1/2006 | Pelz |
| 2011/0201262 A1 | 8/2011 | Lehmann |
| 2012/0234162 A1* | 9/2012 | Tirmizi ................... F42B 3/006 89/1.14 |
| 2013/0333548 A1* | 12/2013 | Enzmann ............... E05B 51/023 89/1.14 |
| 2017/0236663 A1* | 8/2017 | Jung ..................... H01H 33/666 218/140 |

FOREIGN PATENT DOCUMENTS

| | | | | |
|---|---|---|---|---|
| WO | WO-0070231 A1 * | 11/2000 | ............... | A47C 4/04 |
| WO | WO-2009111776 A1 * | 9/2009 | ........... | B64C 1/1469 |

\* cited by examiner

PYROTECHNIC LATCH ACTUATOR RESPONSIVE TO A DECOMPRESSION DETECTION SYSTEM AND METHOD

CROSS REFERENCE TO PRIOR APPLICATIONS

This application claims the benefit of U.S. Provisional Patent Application No. 62/673,083 filed May 17, 2018; U.S. Provisional Patent Application No. 62/681,536 filed Jun. 6, 2018; and U.S. Provisional Patent Application No. 62/681,541 filed Jun. 6, 2018, which are hereby incorporated by reference in their entirety for all purposes as if fully set forth herein.

FIELD OF THE DISCLOSURE

The disclosure relates to a pyrotechnic latch actuator responsive to sensing and signaling systems. Specifically, the disclosure relates to a pyrotechnic latch actuator responsive to pressure sensing systems that detect decompression events.

BACKGROUND OF THE DISCLOSURE

Aircraft are generally equipped with at least one cockpit door. The aircraft often has a separating partition that includes the at least one cockpit door that is located between a pilot, copilot, and/or flight crew (hereinafter referred to as a "pilot") and passengers. The cockpit door provides security and privacy to the cockpit for the pilot. In this regard, the term "cockpit" refers to a location of the aircraft where the pilot is located during operation of the aircraft. The cockpit may also be known as the "flight deck." This is distinguished from the cabin, which refers to a portion of the aircraft where passengers are typically located.

In many aircraft, it is required that the ambient air pressure in the cockpit be generally the same as the ambient air pressure in the passenger cabin of the aircraft. A dangerous situation may arise if there is a sufficiently great pressure difference between opposite sides of the cockpit door or any compartments separated by the partition within the aircraft. One cause of a pressure difference may be a loss of compartment pressurization. Loss of cockpit or cabin pressurization is a potentially serious emergency in an aircraft flying at normal cruising altitude. Loss of cockpit or cabin pressure, or depressurization, is typically classified as explosive, rapid, or gradual, based on the time interval over which cockpit or cabin pressure is lost. A pressure difference caused by a loss of pressurization, depressurization, or decompression (hereinafter generally referred to as decompression) can cause structural deformation, structural damage, and possibly lead to the loss of the aircraft.

Typically, the cockpit door may be locked or unlocked by operation of a door latch. The door latch may be a fully mechanical component; or the door latch may be an electromechanical component. There exists some systems where the cockpit door may be opened by electromechanical operation of the door latch in response to decompression to limit damage. However, during such decompression, especially during explosive or rapid decompression, the electromechanical operated door latch may operate too slowly resulting in possible structural deformation, structural damage, and possibly lead to the loss of the aircraft. In other words, the operation of the electromechanical operated door latch operating to move the door latch from a latched or locked position to an unlatched or unlocked position is slow enough that the aircraft may experience structural damage.

Accordingly, what is needed is a door latch mechanism that operates at a higher velocity to open a cockpit door during episodes of decompression.

SUMMARY OF THE DISCLOSURE

Aspects of the disclosure advantageously provide a pyrotechnic latch actuator responsive to a system and method for monitoring pressure change within at least one compartment of an aircraft associated with decompression events to avoid adverse circumstances.

In various aspects, the disclosure discloses a process and apparatus for accelerating the operation of an electromechanical system through augmentation with a pyrotechnic device. In various aspects, the disclosure discloses an apparatus design implemented such that the normal electrical operation of the electromechanical system and the pyrotechnic operation can be independent. In this regard, the disclosure teaches that the response time of a purely electromechanical system can be accelerated by introducing the energy of a pyrotechnic deflagration into the system. For example, the activation of the pyrotechnic device(s) will cause the electromagnetic device holder to be displaced at a highly accelerated rate. This aspect teaches a self-reset as the pyrotechnic device gases are forced out of the chamber through the spring action. The pyrotechnic devices can be designed for replacement after a decompression, or a false activation. Additionally, there may be a plurality of the pyrotechnic actuators. This feature provides redundancy in the system as well as a second cycle. In this regard, by using a plurality pyrotechnic actuators, if one pyrotechnic actuator is fired by error, there is still another pyrotechnic actuator to address rapid decompression. Moreover, by using a plurality pyrotechnic actuators, if one pyrotechnic actuator fails, there is still another pyrotechnic actuator to address rapid decompression.

In various aspects, the disclosure discloses a process and apparatus for accelerating the operation of an electro-mechanical latch through augmentation with a pyrotechnic actuator. In further aspects, the disclosure discloses a compound system with a mechanical apparatus associated and linked with a pyrotechnic actuator. The apparatus design is such that the normal operation of the electro-mechanical system and the pyrotechnic operation can be independent. The disclosure teaches the that the response time of an electro-mechanical system can be accelerated by introducing the energy of a pyrotechnic deflagration into the system. In one aspect, the activation of the pyrotechnic actuator will cause the latch bolt to be displaced at a highly accelerated rate. In one aspect, there is a second pyrotechnic actuator as a back-up.

In various aspects, the disclosure discloses a process and apparatus for accelerating the activation or deactivation of a deadbolt through augmentation with a pyrotechnic device. In some aspects, the disclosure teaches a deadbolt associated and linked with a pyrotechnic device. The apparatus design is such that the normal operation of the deadbolt and the pyrotechnic operation can be independent. The disclosure teaches that the actuation time can be accelerated by introducing the energy of a pyrotechnic deflagration into the system. In some aspects, the activation of the pyrotechnic device(s) will cause the bolt to be displaced at a highly accelerated rate. The disclosure further teaches a self-reset aspect that operates as the pyrotechnic device gases are forced out of the pressure chamber through the spring action.

The pyrotechnic devices can be designed for replacement after a decompression, or a false activation. Additionally, there may be a plurality of the pyrotechnic actuators. This feature provides redundancy in the system as well as a second cycle. In this regard, by using a plurality pyrotechnic actuators, if one pyrotechnic actuator is fired by error, there is still another pyrotechnic actuator to address rapid decompression. Moreover, by using a plurality pyrotechnic actuators, if one pyrotechnic actuator fails, there is still another pyrotechnic actuator to address rapid decompression.

One general aspect includes a system for monitoring a pressure change within at least one compartment of an aircraft and operating a pyrotechnic device associated with a door latch, including: a door latch structured and arranged in an aircraft door that includes a pyrotechnic actuator and a latch bolt. The system also includes the pyrotechnic actuator configured to move the latch bolt when the pyrotechnic actuator is actuated. The system also includes a pressure sensor configured to provide a pressure signal corresponding to a pressure within a compartment of an aircraft. The system also includes a controller responsive to the pressure signal corresponding to the pressure within a compartment of an aircraft from the pressure sensor. The system also includes the controller further configured to determine a decompression event based on the pressure signal corresponding to the pressure within a compartment of an aircraft from the pressure sensor. The system also includes an output driver configured to generate an output driver signal to actuate the pyrotechnic actuator when the controller determines the decompression event based on the pressure signal corresponding to the pressure within the compartment of the aircraft from the pressure sensor. Other aspects include corresponding computer systems, apparatus, and computer programs recorded on one or more computer storage devices, each configured to perform the actions of the methods.

One general aspect includes a process for monitoring a pressure change within at least one compartment of an aircraft and operating a pyrotechnic device associated with a door latch, including: arranging a door latch in an aircraft door that includes a pyrotechnic actuator and a latch bolt. The process also includes configuring the pyrotechnic actuator to move the latch bolt when the pyrotechnic actuator is actuated. The process also includes generating a pressure signal corresponding to a pressure within a compartment of an aircraft with a pressure sensor. The process also includes receiving the pressure signal corresponding to the pressure within a compartment of an aircraft from the pressure sensor with a controller. The process also includes determining with the controller a decompression event based on the pressure signal corresponding to the pressure within a compartment of an aircraft from the pressure sensor. The process also includes generating a driver signal with an output driver to actuate the pyrotechnic actuator when the controller determines the decompression event based on the pressure signal corresponding to the pressure within the compartment of the aircraft from the pressure sensor. Other aspects include corresponding computer systems, apparatus, and computer programs recorded on one or more computer storage devices, each configured to perform the actions of the methods.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

DETAILED DESCRIPTION OF THE DISCLOSURE

Figure 1:
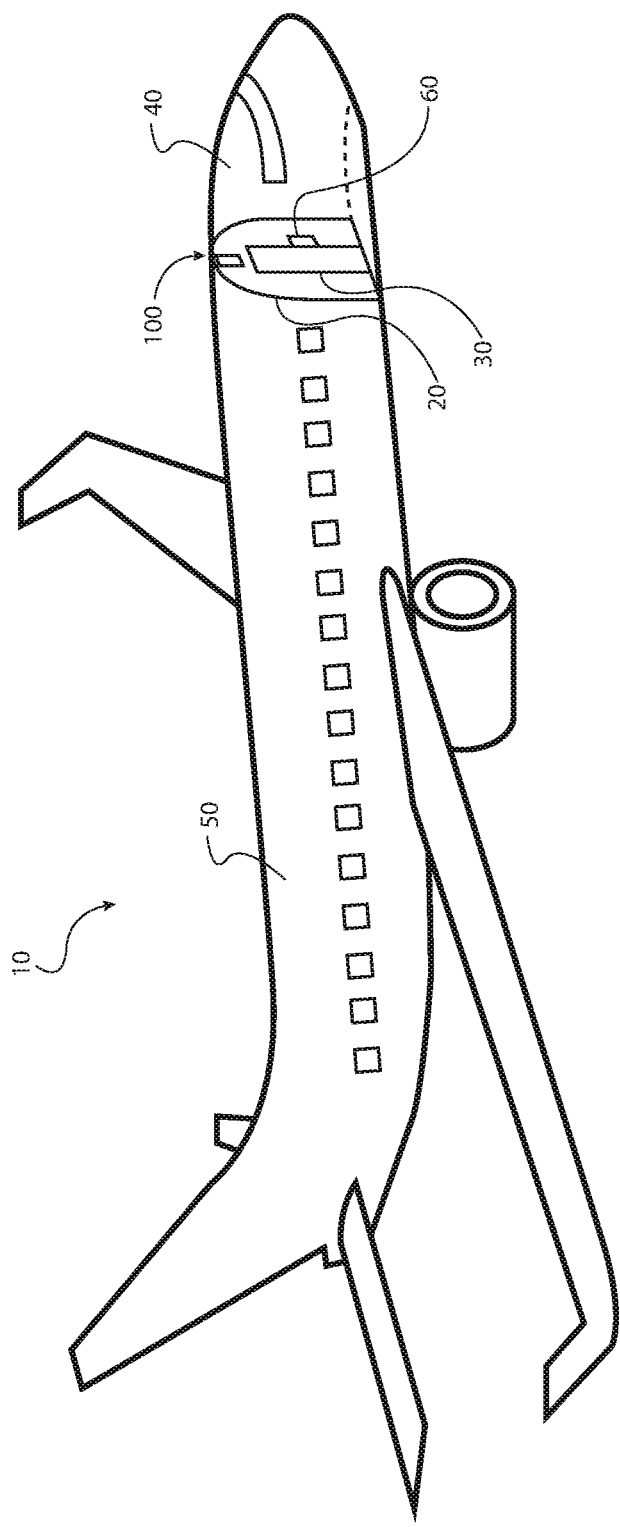
FIG. 1 is a diagram of an aircraft showing both internal components and external components in accordance with an aspect of the disclosure.

The disclosure will now be described with reference to the drawing figures, in which like reference numerals refer to like parts throughout.

Aspects of the disclosure provide a pyrotechnic latch actuator responsive to a system and method for monitoring pressure change within at least one compartment of an aircraft associated with decompression events.

FIG. 1 is a diagram of an aircraft showing both internal components and external components in accordance with an aspect of the disclosure.

As illustrated in FIG. 1, a sensor system 100 may be mounted in an aircraft 10 within the cockpit 40 to monitor the pressure within the cockpit 40. Additionally, the pressure within an adjacent compartment, such as passenger compartment 50, a cargo compartment, or the like may also be monitored by the sensor system 100. If a large enough pressure drop, or change in pressure ΔP, is detected in the cockpit 40 (or, in some aspects, passenger compartment 50), the sensor system 100 sends a notification signal to another device, system, actuator, etc.

For those aspects in which both the cockpit 40 and the passenger compartment 50 are monitored, a typical response to the notification signal provided by sensor system 100 may be, for example, activating a door latch 60 to open a door 30 or an aperture located in, for example, a partition 20, to allow pressure equalization between the cockpit 40 and the passenger compartment 50. The sensor system 100 may be further configured to distinguish between percussive events such as a gunshot, small explosion, and the like and actual decompression events.

Figure 2:
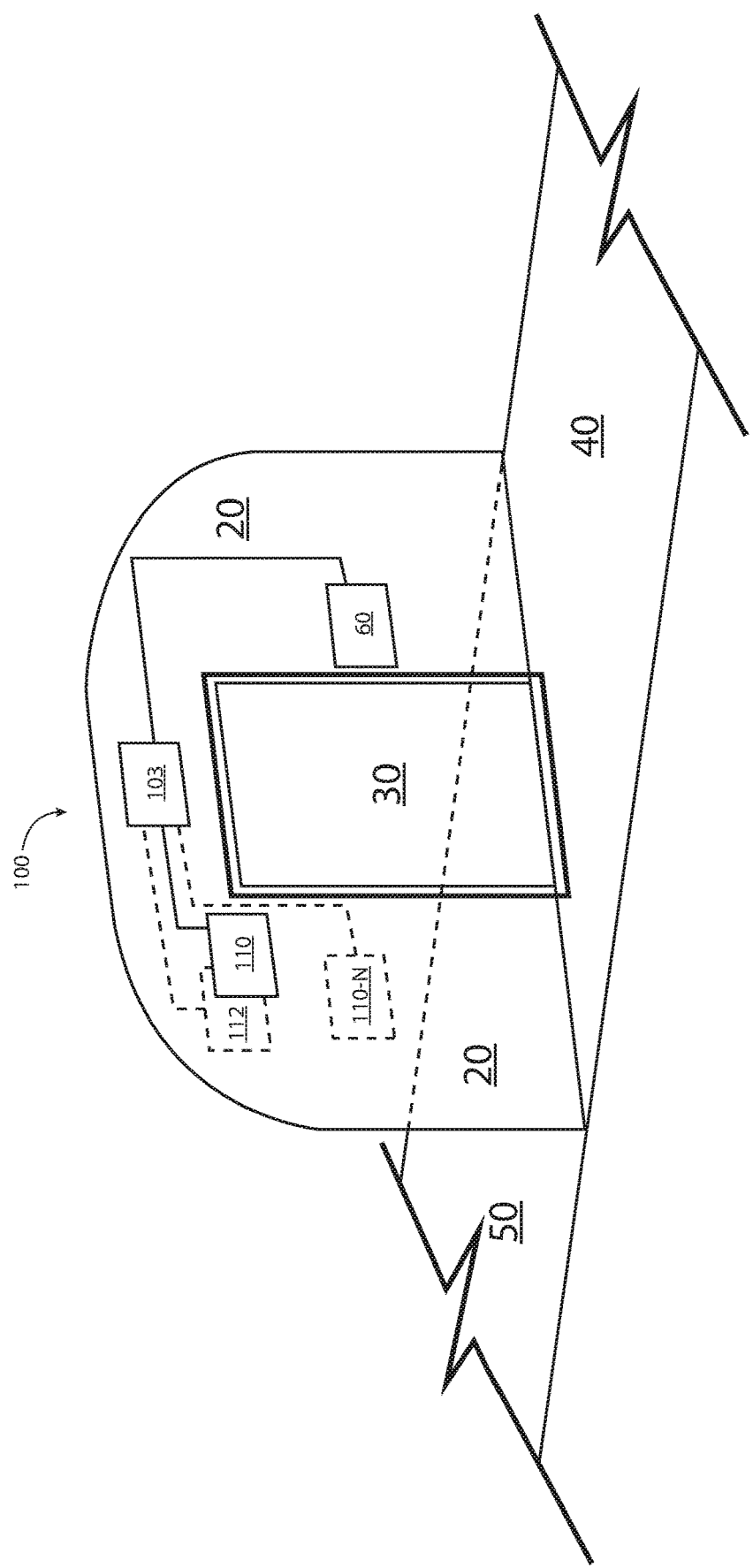
FIG. 2 is a diagram of an expanded section of the airplane of FIG. 1.

FIG. 2 is a diagram of an expanded section of the airplane of FIG. 1.

As illustrated in FIG. 2, the sensor system 100 may include a system controller 103, that may be installed within the cockpit 40 or otherwise located within the aircraft 10. The system controller 103 may be coupled or responsive to a pressure sensor 110. In one aspect, the pressure sensor 110 may be an electronic absolute pressure sensitive device.

In one aspect, the pressure sensor 110 senses the pressure within either the cockpit 40 or the passenger compartment 50. In one aspect, the pressure sensor 110 may be installed within cockpit 40, and a pressure sensor 112 may be remotely installed within the passenger compartment 50. If the pressure drop sensed by the pressure sensor 110 or the pressure sensor 112 is large enough, i.e., meets a predetermined pressure drop target, the system controller 103 may provide a notification signal to another device, system, apparatus, etc. The notification may include informing the pilot of a decompression event via a visual or an auditory indication. Additionally, the system controller 103 may activate the door latch 60 to open the door 30 or an aperture to allow pressure equalization between the cockpit 40 and the passenger compartment 50.

The pressure sensor 110 may be installed generally within the cockpit 40, such as, for example, on the partition 20 in the rear of the cockpit, or forward in the cockpit instrument array, etc.; alternatively, the pressure sensor 110 may be located within the system controller 103 and ported to the cockpit 40. Additionally, the various aspects the system controller 103 and the pressure sensors 110 and 112 may include cables, connectors, and the like. In some aspects, these components may be shielded from tampering. In further aspects, there may be a plurality of the pressure sensors 110 (pressure sensors 110 through pressure sensors 110-N, wherein N is a whole number).

Figure 3:
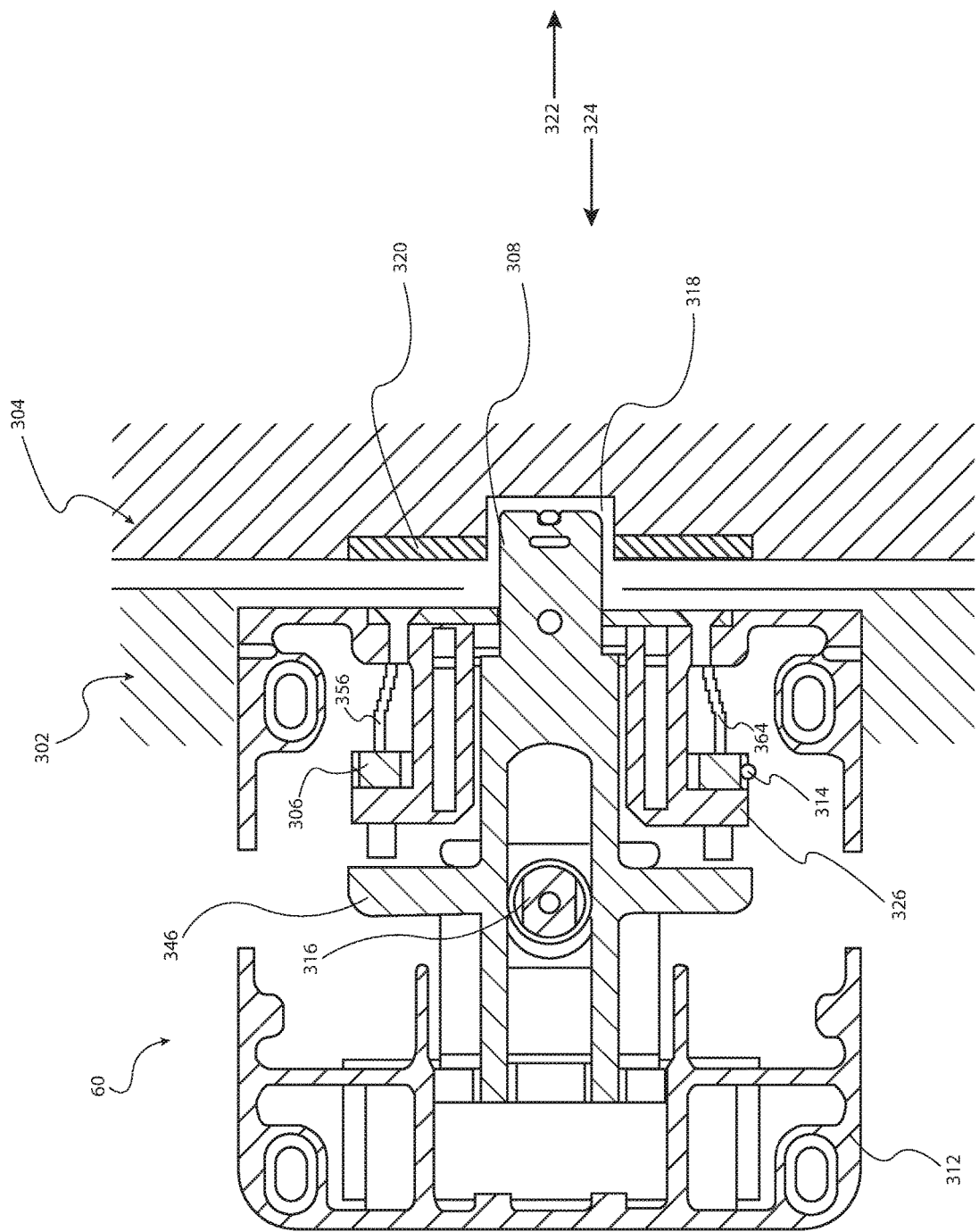
FIG. 3 is a cross-sectional diagram of an aircraft cockpit door, doorjamb, and a door latch in accordance with an aspect of the disclosure.

FIG. 3 is a cross-sectional diagram of an aircraft cockpit door, doorjamb, and door latch in accordance with an aspect of the disclosure.

In particular, FIG. 3 illustrates one aspect of the door latch 60 that may be implemented as a mechanical deadbolt. The door latch 60 may include a latch housing 312 that is attached to a door 302 or is structured and arranged inside the door 302. The latch housing 312 may include one or more mechanical fasteners to secure the latch housing 312 to the door 302. The latch housing 312 may include a latch bolt 308 as well as supporting structure to allow the latch bolt 308 to move in the direction of arrow 322 and move in the opposite direction in the direction of arrow 324. As shown in FIG. 3, the latch bolt 308 has moved in the direction of arrow 322 and extends into a strike plate 320 that is attached to a doorjamb 304. Moreover, the latch bolt 308 extends into a cavity 318 in the doorjamb 304. In the configuration shown in FIG. 3, the door 302 is in a locked configuration such that the door 302 may maintain the closed position with the latch bolt 308 extending into the strike plate 320 and the cavity 318.

The door latch 60 may further include a latch handle 316. The latch handle 316 may be directly connected to the latch bolt 308 and movement of the latch handle 316 in the direction of arrow 322 will likewise move the latch bolt 308 in the direction of arrow 322 to place the door latch 60 in a locked configuration such that the door 302 may remain closed. In a similar manner, movement of the latch handle 316 in the direction of arrow 324 will likewise move the latch bolt in the direction of arrow 324 to place the door latch 60 in an unlocked configuration such that the door 302 may open. In other aspects, the latch handle 316 may include intervening mechanical components such that the movement noted above is mechanically applied to the latch bolt 308 in a similar manner.

In one aspect, the door latch 60 may further include a spring (not shown) or other structure to urge the latch bolt 308 in the direction of arrow 322. In this aspect, the spring is configured to place the latch bolt 308 in the locked position without any intervening interaction with the door latch 60.

The door latch 60 may further include a pyrotechnic actuator 306. The pyrotechnic actuator 306 is responsive to a signal from the sensor system 100. The signal from the sensor system 100 being generated in response to a decompression event as described herein. After receiving the signal from the sensor system 100, the pyrotechnic actuator 306 may be actuated such that it moves the latch bolt 308 in the direction of arrow 324 to place the door 302 in the unlocked and opened configuration. In this unlocked and opened configuration, air is able to travel between the passenger compartment 50 and the cockpit 40 and there is minimal or no pressure differential between the passenger compartment 50 and the cockpit 40 thus preventing or reducing any possible damage.

As the pyrotechnic actuator 306 provides immediate operation and/or faster operation than prior art electromechanical actuators, any possible damage is less than such prior art electromechanical actuators.

In the particular aspect shown in FIG. 3, the pyrotechnic actuator 306 may be mounted on a spring housing 326 that surrounds the latch bolt 308. Movement of the latch handle 316 in the direction of arrow 324 places the latch bolt 308 in the unlocked position. In normal operation, the spring housing 326 is arranged within the latch housing 312 such that the latch bolt 308 may be moved, for example by the latch handle 316, unimpeded through the spring housing 326. The spring housing 326 may further be part of the latch housing 312.

In the event of a decompression event and the determination by the sensor system 100 of the decompression event, the signal generated by the sensor system 100 may be provided to the pyrotechnic actuator 306. The pyrotechnic actuator 306 may be ignited by the signal from the sensor system 100 and generate a gas that expands within the latch housing 312 and drives a flange 346 in the direction of arrow 324. This movement of the flange 346 moves the latch bolt 308 in the direction of arrow 324 placing the door 302 and the door latch 60 in the unlocked position. In some aspects, the flange 346 may be integral with the latch bolt 308.

The pyrotechnic actuator 306 may be ignited in response to the signal from the sensor system 100 provided to at least one wire 356. The pyrotechnic actuator 306 may include a pyrotechnic compound and an electric igniter or electric match. The pyrotechnic compound may include a flammable material as well as an oxidizer blended in situ.

The door latch 60 may further include a pyrotechnic actuator 314 that may have a similar construction to the pyrotechnic actuator 306 and may be initiated by a signal on at least one wire 364. The pyrotechnic actuator 314 may be a backup pyrotechnic actuator for redundancy.

In accordance with aspects of the disclosure, the method and apparatus may provide for an accelerated operation of the door latch 60 through augmentation with the pyrotechnic actuator 306 and/or the pyrotechnic actuator 314. In particular, the actuation of the pyrotechnic actuator 306 and/or the pyrotechnic actuator 314 may cause the latch bolt 308 to be displaced and a highly accelerated rate. In some aspects, the door latch 60 may be configured as a self-reset as the gases from the pyrotechnic actuator 306 are forced out of the latch housing 312. Additionally, the pyrotechnic actuator 306 and pyrotechnic actuator 314 are configured for replacement after operation for another activation.

Figure 4:
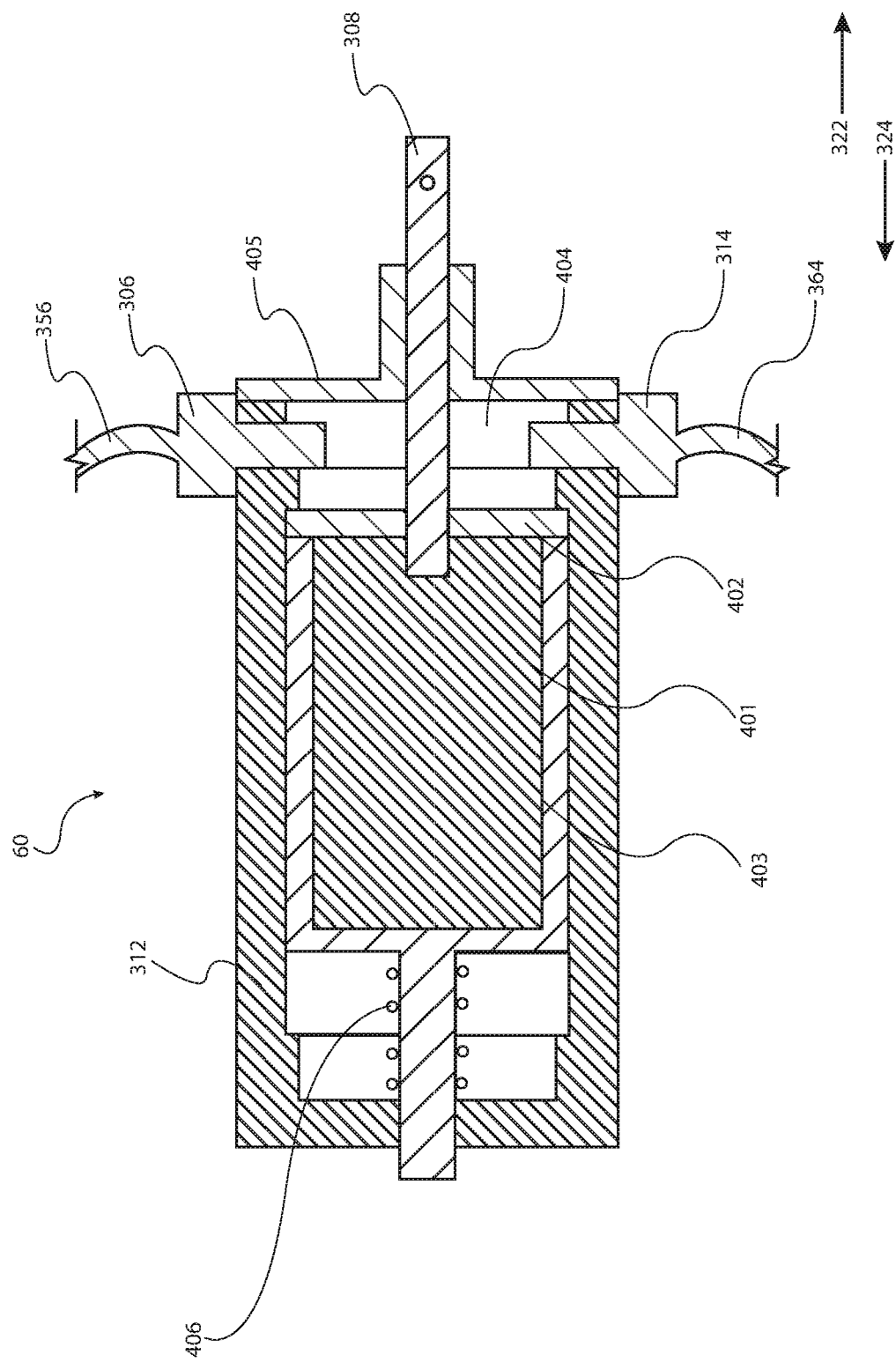
FIG. 4 is a cross-sectional diagram of a door securing mechanism in accordance with another aspect of the disclosure.

FIG. 4 is a cross-sectional diagram of a door securing mechanism in accordance with another aspect of the disclosure.

In particular, FIG. 4 illustrates another aspect of the door latch 60 having a number of components consistent with the FIG. 3 aspect including a latch bolt 308, a latch housing 312, a pyrotechnic actuator 306 that is operationally initiated by a signal received on the at least one wire 356, a pyrotechnic actuator 314 that is operationally initiated by a signal received on the at least one wire 364. It is noted that FIG. 4 does not illustrate the door 302, the doorjamb 304, the strike plate 320, and the cavity 318 for ease of illustration. However, the FIG. 4 aspect would be implemented in conjunction with such components consistent with FIG. 3.

In particular, FIG. 4 illustrates one aspect of the door latch 60 that may be implemented as an electromechanical deadbolt. The door latch 60 may further include an electromechanical device 401. In one aspect, the electromechanical device 401 may be a solenoid that moves together with the latch bolt 308 from the locked configuration to the unlocked configuration. In one aspect, the solenoid may include a coil of wire wrapped around a soft iron core, an iron yoke, which provides a low reluctance path for magnetic flux, and a movable iron armature that may move together with the latch bolt 308. However, the electromechanical device 401 may be implemented using any known technology including an electromechanical solenoid, rotary solenoid, rotary voice coil solenoid, and the like.

The electromechanical device 401 may be directly connected to the latch bolt 308 and movement of the electromechanical device 401 in the direction of arrow 322 will likewise move the latch bolt 308 in the direction of arrow 322 to place the door latch 60 in a locked configuration such that the door 302 may remain closed. In a similar manner, movement of the electromechanical device 401 in the direction of arrow 324 will likewise move the latch bolt in the direction of arrow 324 to place the door latch 60 in an unlocked configuration such that the door 302 may open. In other aspects, the electromechanical device 401 may include intervening mechanical components such that the movement noted above is mechanically applied to the latch bolt 308 in a similar manner. The electromechanical device 401 may include a power source that is selectively applied to the electromechanical device 401 through a switch mechanism such as an input button for operational movement consistent with that described above.

In one aspect, the door latch 60 may further include a spring 406 or other structure to urge the latch bolt 308 in the direction of arrow 322. In this aspect, the spring 406 may be configured to place the latch bolt 308 in the locked position without any intervening interaction with the door latch 60.

The door latch 60 may further include a pyrotechnic actuator 306. The pyrotechnic actuator 306 is responsive to a signal from the sensor system 100. The signal from the sensor system 100 being generated in response to a decompression event as described herein. After receiving the signal from the sensor system 100, the pyrotechnic actuator 306 may be actuated such that it moves the latch bolt 308 in the direction of arrow 324 to place the door 302 in the unlocked and opened configuration. In this unlocked and opened configuration, air is able to travel between the passenger compartment 50 and the cockpit 40 and there is minimal or no pressure differential between the passenger compartment 50 and the cockpit 40 thus preventing or reducing any possible damage.

As the pyrotechnic actuator 306 provides immediate operation and/or faster operation than prior art electromechanical actuators, any possible damage is less than such prior art electromechanical actuators.

In the particular aspect shown in FIG. 4, the door latch 60 may include a housing cap 405 that surrounds at least in part the latch bolt 308. The electromechanical device 401 may be attached the latch bolt 308 and move with the latch bolt 308 as described above. The electromechanical device 401 may further include a solenoid holder 403 that holds the electromechanical device 401. The electromechanical device 401 may further include a holder cap 402 for holding the electromechanical device 401. The pyrotechnic actuator 306 may be mounted on the latch housing 312 that surrounds the latch bolt 308.

In the event of a decompression event and the determination by the sensor system 100 of the decompression event, the signal generated by the sensor system 100 may be provided to the pyrotechnic actuator 306. The pyrotechnic actuator 306 may be ignited by the signal from the sensor system 100 and generate gas that expands within a pressure chamber 404 located between the holder cap 402 and the housing cap 405 and drives the solenoid holder 403 in the direction of arrow 324. This movement of the solenoid holder 403 moves the latch bolt 308 in the direction of arrow 324 placing the door 302 and the door latch 60 in the unlocked position. This movement of the solenoid holder 403 additionally compresses the spring 406. In one aspect, the spring 406 may be a compression spring. The spring 406 may be configured to place the solenoid holder 403 in an operative locked position during normal operations as shown in FIG. 4. The spring 406 may be configured to return the solenoid holder 403 to an operative position consistent with FIG. 4 after actuation of the pyrotechnic actuator 306.

The door latch 60 may further include a pyrotechnic actuator 314 that may have a similar construction to the pyrotechnic actuator 306 and may be initiated by a signal on at least one wire 364. The pyrotechnic actuator 314 may be a backup pyrotechnic actuator.

Figure 5:
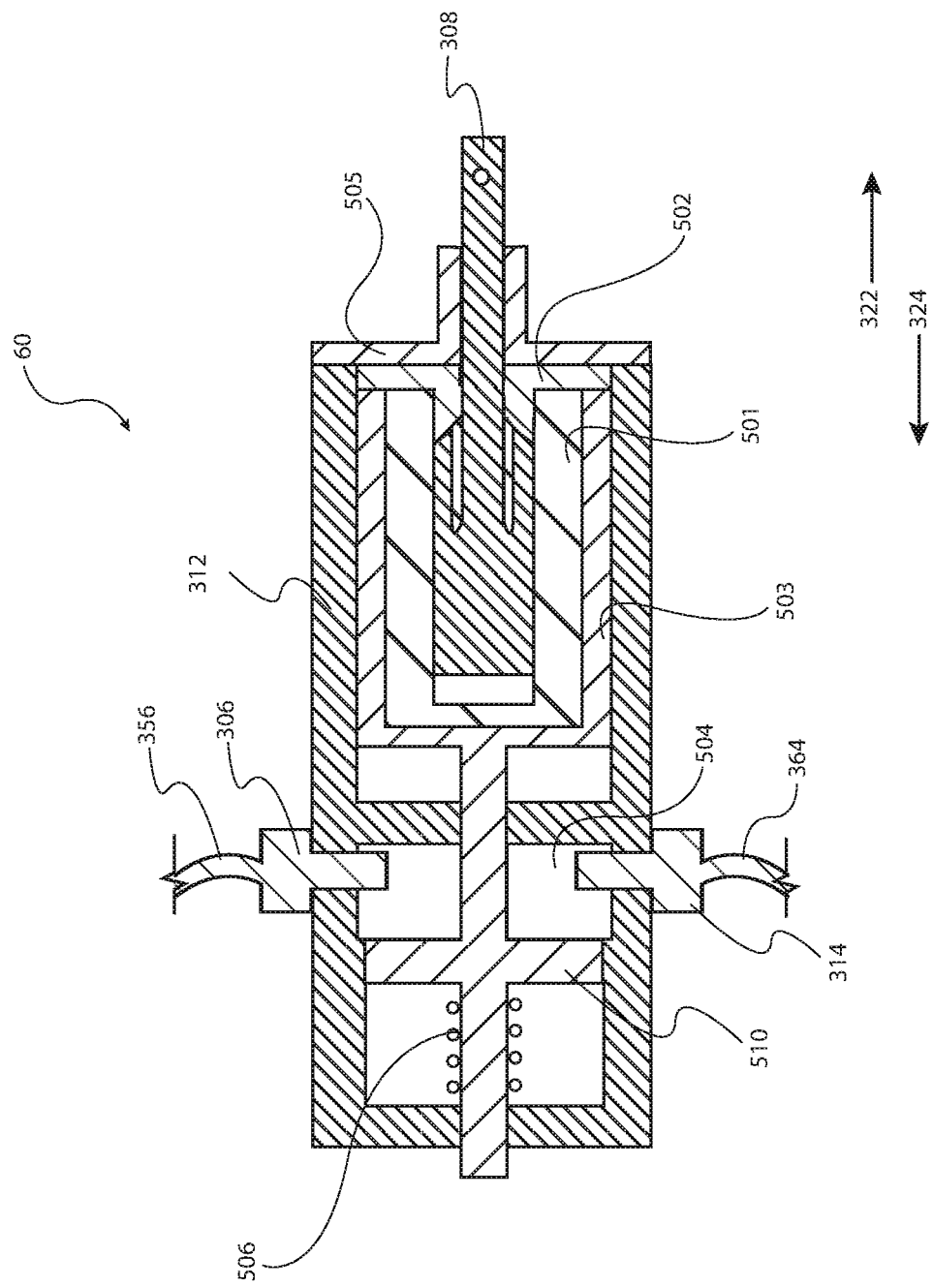
FIG. 5 is a cross-sectional diagram of a door securing mechanism in accordance with another aspect of the disclosure.

FIG. 5 is a cross-sectional diagram of a door securing mechanism in accordance with another aspect of the disclosure.

In particular, FIG. 5 illustrates another aspect of the door latch 60 having a number of components consistent with the FIG. 3 aspect including a latch bolt 308, a latch housing 312, a pyrotechnic actuator 306 that is operationally initiated by a signal received on the at least one wire 356, a pyrotechnic actuator 314 that is operationally initiated by a signal received on the at least one wire 364. It is noted that FIG. 5 does not illustrate the door 302, the doorjamb 304, the strike plate 320, and the cavity 318 for ease of illustration. However, the FIG. 5 aspect would be implemented in conjunction with such components consistent with FIG. 3.

In particular, FIG. 5 illustrates one aspect of the door latch 60 that may be implemented as an electromechanical deadbolt. The door latch 60 may further include a solenoid 501. In one aspect, the solenoid 501 is a single stage solenoid. In one aspect, the solenoid 501 may be a solenoid that moves the latch bolt 308 from the locked configuration to the unlocked configuration.

The solenoid 501 may be configured to move the latch bolt 308 in the direction of arrow 322 to place the door latch 60 in a locked configuration such that the door 302 may remain closed. In a similar manner, reverse operation of the solenoid 501 will likewise move the latch bolt in the direction of arrow 324 to place the door latch 60 in an unlocked configuration such that the door 302 may open.

In one aspect, the door latch 60 may further include a spring (not shown) or other structure to urge the latch bolt 308 in the direction of arrow 322. In this aspect, the spring is configured to place the latch bolt 308 in the locked position without any intervening interaction with the door latch 60.

The door latch 60 may further include a pyrotechnic actuator 306. The pyrotechnic actuator 306 is responsive to a signal from the sensor system 100. The signal from the sensor system 100 being generated in response to a decompression event as described herein. After receiving the signal from the sensor system 100, the pyrotechnic actuator 306 may be actuated such that it moves the latch bolt 308 in the direction of arrow 324 to place the door 302 in the unlocked and opened configuration. In this unlocked and opened configuration, air is able to travel between the passenger compartment 50 and the cockpit 40 and there is minimal or no pressure differential between the passenger compartment 50 and the cockpit 40 thus preventing or reducing any possible damage.

As the pyrotechnic actuator 306 provides immediate operation and/or faster operation than prior art electromechanical actuators, any possible damage is less than such prior art electromechanical actuators.

In the particular aspect shown in FIG. 5, the door latch 60 may include a housing cap 505 that surrounds at least in part the latch bolt 308. The solenoid 501 may receive the latch bolt 308 and move the latch bolt 308 as described above. The solenoid 501 may further include a solenoid holder 503 that holds the solenoid 501. The solenoid 501 may further include a holder cap 502 for holding the solenoid 501. The pyrotechnic actuator 306 may be mounted on the latch housing 312 adjacent a pressure chamber 504.

In the event of a decompression event and the determination by the sensor system 100 of the decompression event, the signal generated by the sensor system 100 may be provided to the pyrotechnic actuator 306. The pyrotechnic actuator 306 may be ignited by the signal from the sensor system 100 and generate gas that expands within the pressure chamber 504 located adjacent a flange 510 and drives the flange 510 and the solenoid holder 503 in the direction of arrow 324. This movement of the solenoid holder 503 moves the latch bolt 308 in the direction of arrow 324 placing the door 302 and the door latch 60 in the unlocked position. This movement of the solenoid holder 503 additionally compresses a compression spring 506. The compression spring 506 may be configured to place the solenoid holder 503 in an operative position during normal operations as shown in FIG. 5. The compression spring 506 may be configured to return the solenoid holder 503 to an operative position consistent with FIG. 5 after actuation of the pyrotechnic actuator 306.

The door latch 60 may further include a pyrotechnic actuator 314 that may have a similar construction to the pyrotechnic actuator 306 and may be initiated by a signal on at least one wire 364. The pyrotechnic actuator 314 may be a backup pyrotechnic actuator.

Figure 6:
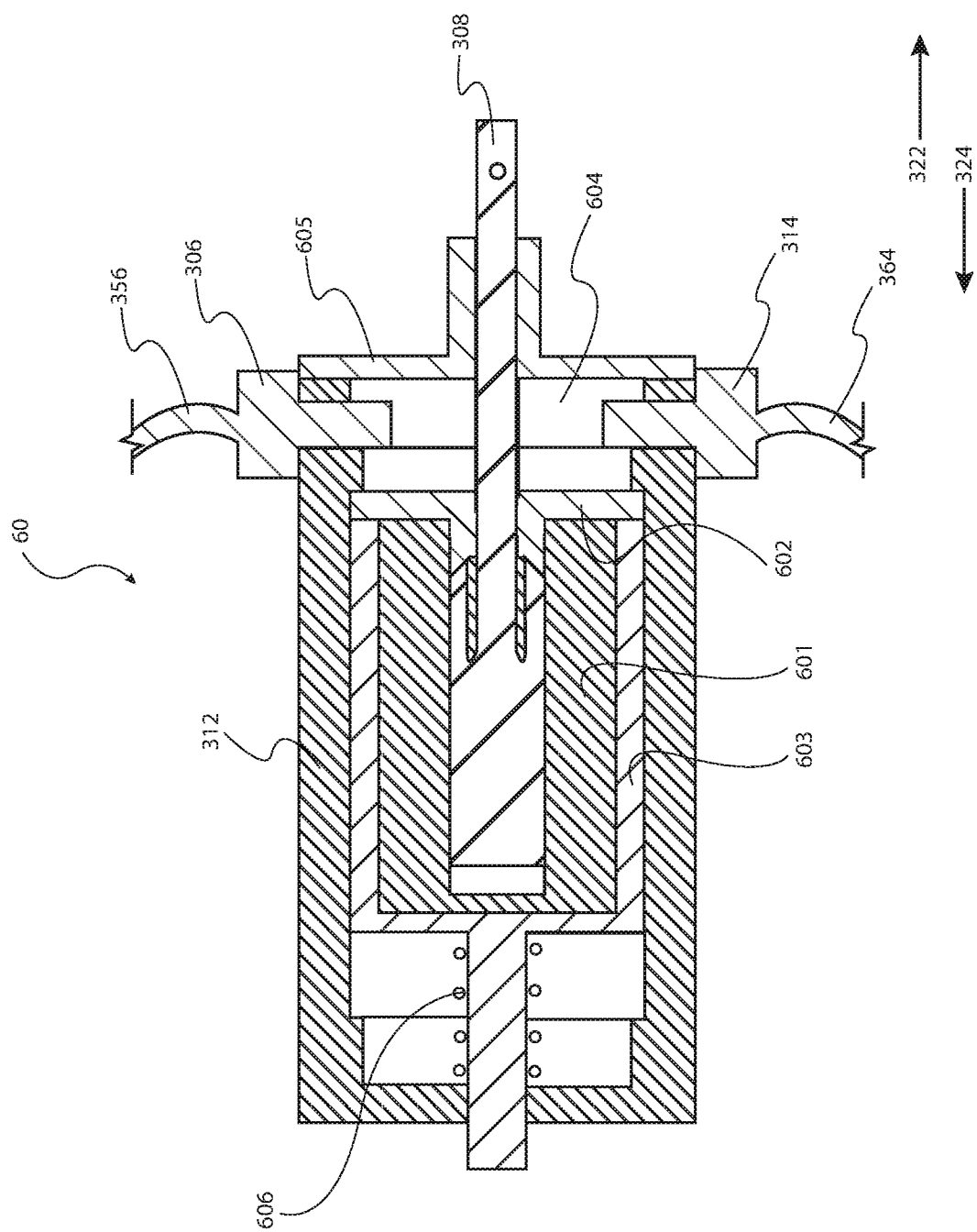
FIG. 6 is a cross-sectional diagram of a door securing mechanism in accordance with another aspect of the disclosure.

FIG. 6 is a cross-sectional diagram of a door securing mechanism in accordance with another aspect of the disclosure.

In particular, FIG. 6 illustrates another aspect of the door latch 60 having a number of components consistent with the FIG. 3 aspect including a latch bolt 308, a latch housing 312, a pyrotechnic actuator 306 that is operationally initiated by a signal received on the at least one wire 356, a pyrotechnic actuator 314 that is operationally initiated by a signal received on the at least one wire 364. It is noted that FIG. 6 does not illustrate the door 302, the doorjamb 304, the strike plate 320, and the cavity 318 for ease of illustration. However, the FIG. 6 aspect would be implemented in conjunction with such components consistent with FIG. 3.

In particular, FIG. 6 illustrates one aspect of the door latch 60 that may be implemented as an electromechanical deadbolt. The door latch 60 may further include a solenoid 601. In one aspect, the solenoid 601 may be a solenoid that moves the latch bolt 308 from the locked configuration to the unlocked configuration.

The solenoid 601 may be configured to move the latch bolt 308 in the direction of arrow 322 to place the door latch 60 in a locked configuration such that the door 302 may remain closed. In a similar manner, reverse operation of the solenoid 601 will likewise move the latch bolt 308 in the direction of arrow 324 to place the door latch 60 in an unlocked configuration such that the door 302 may open.

In one aspect, the door latch 60 may further include a spring (not shown) or other structure to urge the latch bolt 308 in the direction of arrow 322. In this aspect, the spring is configured to place the latch bolt 308 in the locked position without any intervening interaction with the door latch 60.

The door latch 60 may further include a pyrotechnic actuator 306. The pyrotechnic actuator 306 is responsive to a signal from the sensor system 100. The signal from the sensor system 100 being generated in response to a decompression event as described herein. After receiving the signal from the sensor system 100, the pyrotechnic actuator 306 may be actuated such that it moves the latch bolt 308 in the direction of arrow 324 to place the door 302 in the unlocked and opened configuration. In this unlocked and opened configuration, air is able to travel between the passenger compartment 50 and the cockpit 40 and there is minimal or no pressure differential between the passenger compartment 50 and the cockpit 40 thus preventing or reducing any possible damage.

As the pyrotechnic actuator 306 provides immediate operation and/or faster operation than prior art electromechanical actuators, any possible damage is less than such prior art electromechanical actuators.

In the particular aspect shown in FIG. 6, the door latch 60 may include a housing cap 605 that surrounds at least in part the latch bolt 308. The solenoid 601 may receive the latch bolt 308 and move the latch bolt 308 as described above. The solenoid 601 may further include a solenoid holder 603 that holds both the solenoid 601 and the latch bolt 308. The solenoid 601 may further include a holder cap 602 for holding the solenoid 601. The pyrotechnic actuator 306 may be mounted on the latch housing 312 that surrounds the latch bolt 308.

In the event of a decompression event and the determination by the sensor system 100 of the decompression event, the signal generated by the sensor system 100 may be provided to the pyrotechnic actuator 306. The pyrotechnic actuator 306 may be ignited by the signal from the sensor system 100 and generate gas that expands within a pressure chamber 604 located adjacent the housing cap 605 and the holder cap 602 and drives the solenoid holder 603 in the direction of arrow 324. This movement of the solenoid holder 603 moves the latch bolt 308 in the direction of arrow 324 placing the door 302 and the door latch 60 in the unlocked position. This movement of the solenoid holder 603 additionally compresses a compression spring 606. The compression spring 606 may be configured to place the solenoid holder 603 in an operative position during normal operations as shown in FIG. 6. The compression spring 606 may be configured to return the solenoid holder 603 to an operative position consistent with FIG. 6 after actuation of the pyrotechnic actuator 306.

The door latch 60 may further include a pyrotechnic actuator 314 that may have a similar construction to the pyrotechnic actuator 306 and may be initiated by a signal on at least one wire 364. The pyrotechnic actuator 314 may be a backup pyrotechnic actuator.

Figure 7:
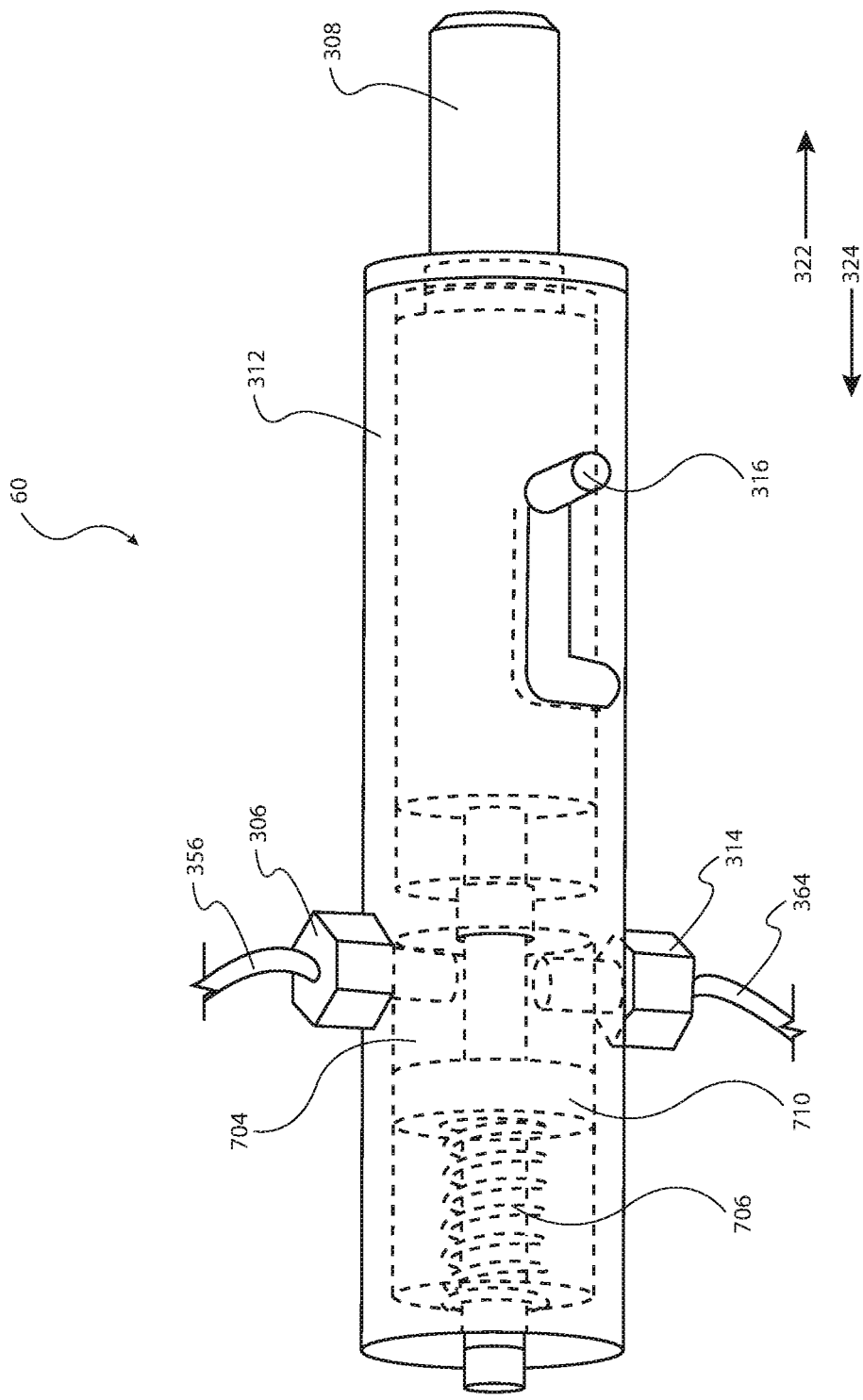
FIG. 7 is a diagram of a door securing mechanism in accordance with another aspect of the disclosure.

FIG. 7 is a diagram of a door securing mechanism in accordance with another aspect of the disclosure.

In particular, FIG. 7 illustrates one aspect of the door latch 60 that may be implemented as a mechanical deadbolt. The door latch 60 may further include a latch handle 316 and the latch housing 312. The latch handle 316 may be directly connected to the latch bolt 308 and movement of the latch handle 316 in the direction of arrow 322 will likewise move the latch bolt 308 in the direction of arrow 322 to place the door latch 60 in a locked configuration such that the door 302 may remain closed. In a similar manner, movement of the latch handle 316 in the direction of arrow 324 will likewise move the latch bolt 308 in the direction of arrow 324 to place the door latch 60 in an unlocked configuration such that the door 302 may open. In other aspects, the latch handle 316 may include intervening mechanical components such that the movement noted above is mechanically applied to the latch bolt 308 in a similar manner.

In one aspect, the door latch 60 may further include a spring 706 or other structure to urge the latch bolt 308 in the direction of arrow 322. In this aspect, the spring 706 may be configured to place the latch bolt 308 in the locked position without any intervening interaction with the door latch 60.

The door latch 60 may further include a pyrotechnic actuator 306. The pyrotechnic actuator 306 is responsive to a signal from the sensor system 100 on at least one wire 356. The signal from the sensor system 100 being generated in response to a decompression event as described herein. After receiving the signal from the sensor system 100, the pyrotechnic actuator 306 may be actuated such that it moves the latch bolt 308 in the direction of arrow 324 to place the door 302 in the unlocked and opened configuration. In this unlocked and opened configuration, air is able to travel between the passenger compartment 50 and the cockpit 40 and there is minimal or no pressure differential between the passenger compartment 50 and the cockpit 40 thus preventing or reducing any possible damage.

As the pyrotechnic actuator 306 provides immediate operation and/or faster operation than prior art electromechanical actuators, any possible damage is less than such prior art electromechanical actuators.

In the particular aspect shown in FIG. 7, the pyrotechnic actuator 306 may be mounted in or on a pressure chamber 704. In the event of a decompression event and the determination by the sensor system 100 of the decompression event, the signal generated by the sensor system 100 may be provided to the pyrotechnic actuator 306. The pyrotechnic actuator 306 may be ignited by the signal from the sensor system 100 and generate gas that expands within the pressure chamber 704 and drives a flange 710 in the direction of arrow 324. This movement of the flange 710 moves the latch bolt 308 in the direction of arrow 324 placing the door 302 and the door latch 60 in the unlocked position.

The door latch 60 may further include a pyrotechnic actuator 314 that may have a similar construction to the pyrotechnic actuator 306 and may be initiated by a signal on at least one wire 364. The pyrotechnic actuator 314 may be a backup pyrotechnic actuator.

Figure 8:
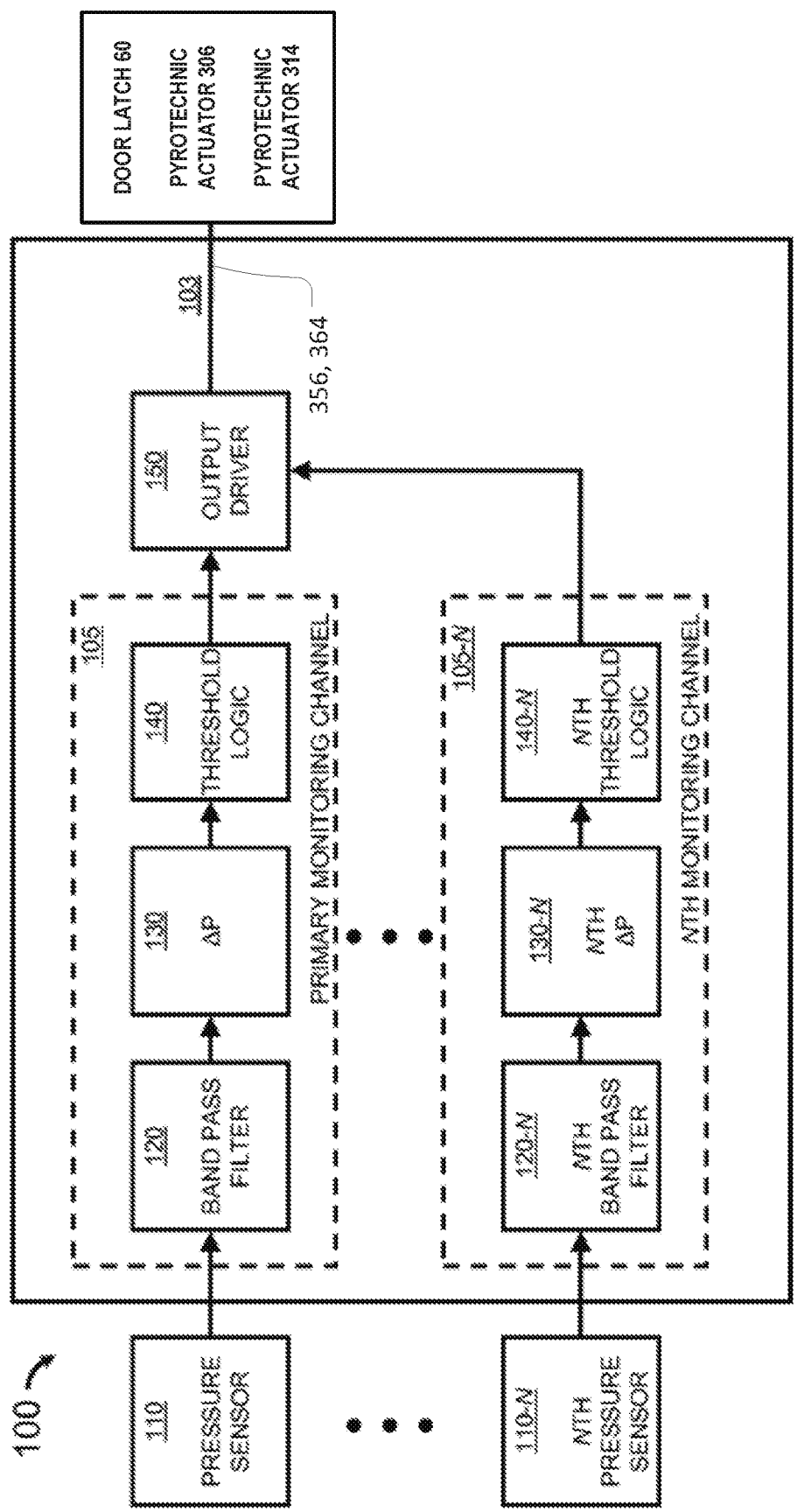
FIG. 8 is a block diagram of a system for monitoring pressure in an aircraft in accordance with an aspect of the disclosure.

FIG. 8 is a block diagram of a system for monitoring pressure in at least one compartment of an aircraft in accordance with an aspect of the disclosure.

The sensor system 100 generally includes at least one pressure sensor 110 coupled to the system controller 103. The system controller 103 may include at least a primary monitoring channel 105 and an output driver 150. In one aspect, the output driver 150 provides a driver signal associated with the decompression event to the door latch 60 to initiate the pyrotechnic actuator 306 and open the door 30. In particular, the output driver 150 provides a driver signal associated with the decompression event to the at least one wire 356 and/or the at least one wire 364 to initiate the pyrotechnic actuator 306 and/or the pyrotechnic actuator 314 and open the door 30.

The system controller 103 may be implemented in a number of different ways. In one aspect, the system controller 103 may be implemented by a dedicated analog circuit. In one aspect, the system controller 103 may be implemented by a dedicated computer processor. In one aspect, the system controller 103 may be implemented by an application specific integrated circuit (ASIC). In one aspect, the system controller 103 may be implemented by a field programmable gate array (FPGA). In one aspect, the system controller 103 may be implemented by the flight warning system. In one aspect, the system controller 103 may be implemented by an avionics system. In one aspect, the system controller 103 may be implemented by the central maintenance system.

The system controller 103 may be implemented by any of the above noted systems and may be configured to provide one or more of the following described processes and/or functions. In one aspect, the system controller 103 may be configured such that the primary monitoring channel 105 may include a band pass filtering functionality, a pressure change determination functionality, and a pressure threshold determination functionality. In one aspect, the system controller 103 may implement digital signal processing capability and/or software for band pass filtering functionality, pressure change determination functionality, and pressure threshold determination functionality. In one aspect, the system controller 103 may be configured such that the primary monitoring channel 105 may include a band pass filter 120, a pressure change signal circuit 130, and a threshold logic circuit 140. In other aspects, the system controller 103 may include multiple monitoring channels 105 to 105-N, each of the N channels coupled to a respective pressure sensor 110-N. Additionally, the system controller 103 and/or the sensor system 100 may include additional features as described in Applicant's United States patent publication number 2011/0201262, published Aug. 18, 2011 and incorporated by reference herein in its entirety.

The pressure sensor 110 may provide a pressure signal corresponding to a pressure $P_1$ within the compartment of the aircraft 10, and the band pass filter 120 may receive and filter the pressure sensor signals. The band pass filter 120 may advantageously reduce the operational noise floor and provide sensitivity only to regions of interest.

The pressure change signal circuit 130 receives the filtered pressure signal, determines a change in pressure $\Delta P_1$, and provides a pressure change output signal corresponding to the change in pressure $\Delta P_1$. This value may then be provided to the threshold logic circuit 140. The threshold logic circuit 140 determines whether the pressure change output signal meets a predetermined threshold and provides a threshold output signal, indicating that a decompression event has occurred, to the output driver 150 if the pressure change output meets the predetermined threshold.

In one aspect, the output driver 150 provides a notification signal associated with the decompression event to the door latch 60 to initiate the pyrotechnic actuator 306 and open the door 302. In one aspect, the output driver 150 provides a notification signal associated with the decompression event to the door latch 60 to initiate the pyrotechnic actuator 314 and open the door 302. In one aspect, the output driver 150 provides a notification signal associated with the decompression event to the door latch 60 to initiate the pyrotechnic actuator 306 and in response to the determination of a failure to open the door 30, the output driver 150 provides a notification signal associated with the decompression event to the door latch 60 to initiate the pyrotechnic actuator 314 and open the door 302.

In additional aspects, the output driver 150 provides a notification signal associated with the decompression event to another device, system, actuator, etc.

In an aspect that include N pressure sensors 110 to 110-N, the system controller 103 includes N monitoring channels 105 to 105-N, each of which is coupled to a respective pressure sensor 110-N. Each of the N monitoring channels is coupled to the output driver 150, which provides the notification signal if any N monitoring channel's threshold logic indicates a decompression event has occurred. Alternatively, the output driver 150 may operate based on a more advanced paradigm, such as a voting system in response to one or more N monitoring channel's threshold logic indicating a decompression event has occurred. In addition, the multiple monitoring channels may be used in a compartment to provide redundancy.

Figure 9:
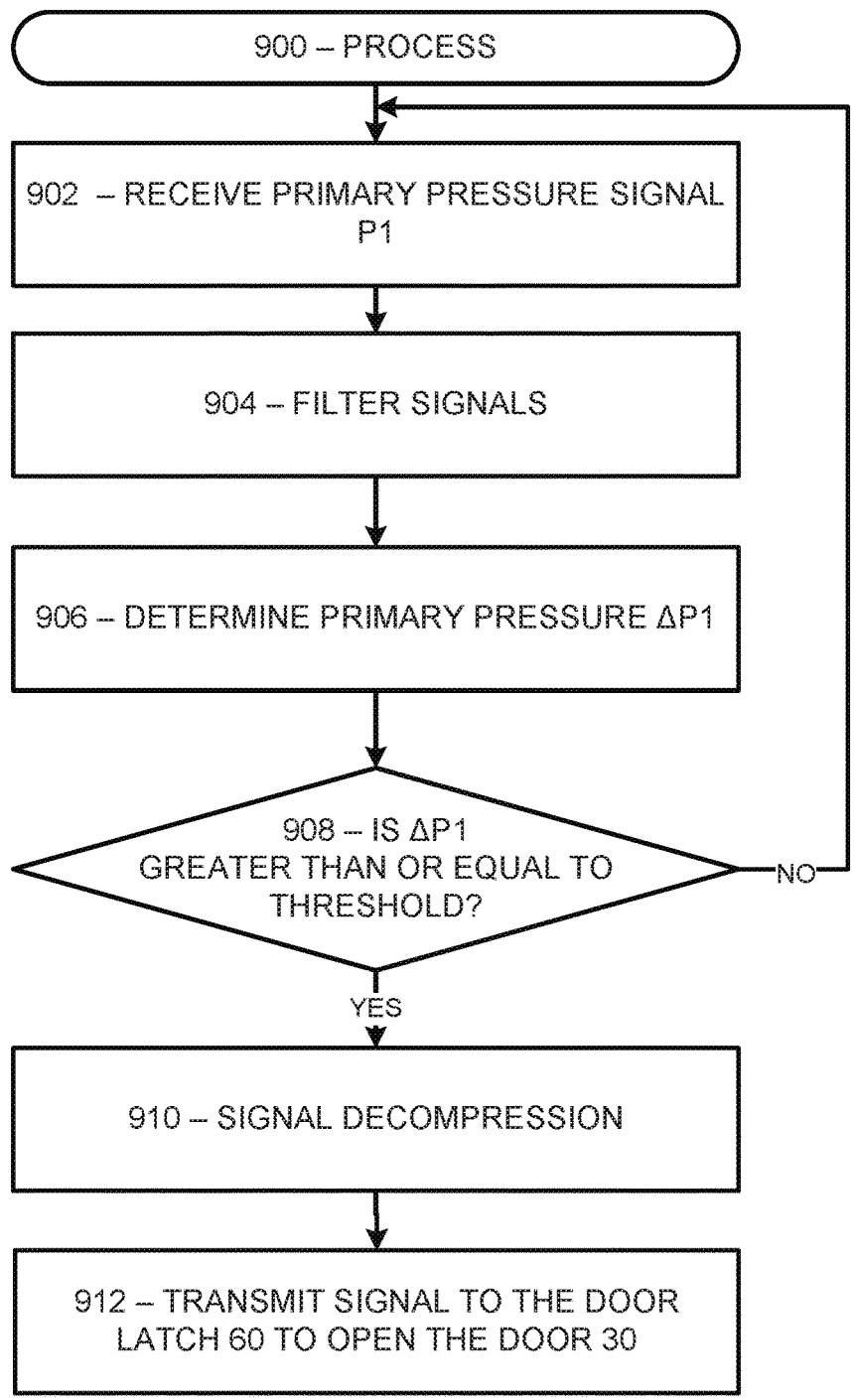
FIG. 9 is a flow chart of a method of monitoring pressure in an aircraft according to an aspect of the disclosure.

FIG. 9 is a flow chart of a method of monitoring pressure in a compartment of an aircraft according to an aspect of the disclosure.

In particular, FIG. 9 illustrates a process 900 for monitoring a primary monitoring channel 105. It should be appreciated that, if additional monitoring channels are used, there would be a similar process associated with each monitoring channel. The process 900 may be implemented in hardware or software by the system controller 103 and/or the sensor system 100. The process 900 for the primary monitoring channel 105 may include receiving a pressure signal 902 corresponding to a pressure $P_1$ within a compartment of an aircraft 10 (such as, for example, the cockpit 40).

In one aspect, at step 904, signals are filtered that are outside of a predetermined frequency band. In particular, the signals may be filtered by a filter or filter software implemented by the system controller 103 and/or the sensor system 100.

Next, a change in pressure $\Delta P_1$ 906 is determined by the system controller 103 and/or the sensor system 100.

At step 908, a determination is made as to whether the pressure change $\Delta P_1$ meets a predetermined threshold. In the illustrated step 908, a greater than or equal to comparison is made, although the disclosure is not intended to be so limited. If the determination is NO, then the process 900 returns to step 902. If the determination is YES, then a notification signal is provided indicating that a decompression event has occurred 910, which is generated by the system controller 103 and/or the sensor system 100.

At step 912, the output driver 150 may transmit a signal over the at least one wire 356 and/or the at least one wire 364 to the door latch 60 to initiate the pyrotechnic actuator 306 and/or the pyrotechnic actuator 314. In one aspect, the output driver 150 provides a notification signal associated with the decompression event to the door latch 60 to initiate the pyrotechnic actuator 306 and open the door 302. In one aspect, the output driver 150 provides a notification signal associated with the decompression event to the door latch 60 to initiate the pyrotechnic actuator 314 and open the door 302. In one aspect, the output driver 150 provides a notification signal associated with the decompression event to the door latch 60 to initiate the pyrotechnic actuator 306 and in response to the determination of a failure to open the door 30, the output driver 150 provides a notification signal associated with the decompression event to the door latch 60 to initiate the pyrotechnic actuator 314 and open the door 302.

Aspects of the disclosure include means for performing any of the above-described actions and/or steps.

Further in accordance with various aspects of the disclosure, the methods described herein are intended for operation with dedicated hardware implementations including, but not limited to, PCs, semiconductors, application specific integrated circuits (ASIC), programmable logic arrays, cloud computing devices, field programmable gate array (FPGA), and other hardware devices constructed to implement the methods described herein.

It should also be noted that any software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. For example, the system controller 103 may be implemented as a decompression and door actuation controller; the sensor system 100 may be implemented as a decompression and door actuation system. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A system for monitoring a pressure change within at least one compartment of an aircraft and operating a pyrotechnic device associated with a door latch, comprising:
a door latch structured and arranged in an aircraft door that comprises a pyrotechnic actuator and a latch bolt;
the pyrotechnic actuator configured to move and unlock the latch bolt when the pyrotechnic actuator is actuated;
a pressure sensor configured to provide a pressure signal corresponding to a pressure within a compartment of an aircraft;
a controller responsive to the pressure signal corresponding to the pressure within a compartment of an aircraft from the pressure sensor;
the controller further configured to determine a decompression event based on the pressure signal corresponding to the pressure within a compartment of an aircraft from the pressure sensor;
an output driver configured to generate an output driver signal to actuate the pyrotechnic actuator when the controller determines the decompression event based on the pressure signal corresponding to the pressure within the compartment of the aircraft from the pressure sensor;
an electromechanical device configured to receive power and electromechanically move the latch bolt from a locked position to an unlocked position; and
the electromechanical device configured to receive power and electromechanically move the latch bolt from an unlocked position to a locked position,
wherein the pyrotechnic device is configured to move the electromechanical device and the latch bolt when the pyrotechnic device is actuated.

2. The system of claim 1, further comprising:
a flange that is connected to the latch bolt and configured to move the latch bolt in response to the pyrotechnic actuator being actuated.

3. The system of claim 1, further comprising:
a latch housing configured to house at least the latch bolt; and
a pressure chamber located within the latch housing, the pressure chamber operatively connected to the pyrotechnic actuator.

4. The system of claim 1, further comprising:
a spring configured to be moved in response to the pyrotechnic actuator being actuated and the latch bolt being moved by an actuation of the pyrotechnic actuator; and
the spring further configured to return the latch bolt to a normal operating position after implementation of the pyrotechnic actuator.

5. The system of claim 1, further comprising:
a housing configured to support the pyrotechnic actuator; and
the housing configured to contact a flange that is connected to the latch bolt and configured to move the latch bolt in response to the pyrotechnic actuator being actuated.

6. The system of claim 1, further comprising:
a latch housing configured to house at least the latch bolt;
a pressure chamber located within the latch housing, the pressure chamber operatively connected to the pyrotechnic actuator;
a spring configured to be moved in response to the pyrotechnic actuator being actuated and the latch bolt being moved by an actuation of the pyrotechnic actuator; and
the spring further configured to return the latch bolt to a normal operating position after implementation of the pyrotechnic actuator.

7. The system of claim 1, wherein
the controller being configured to band pass filter the pressure signal and generate a filtered pressure signal;
the controller being configured to determine a change in the filtered pressure signal and generate a pressure change output signal corresponding to a change in pressure; and
the controller being configured to determine whether the pressure change output signal meets a predetermined threshold and generate a threshold output signal indicating that a decompression event has occurred if the pressure change output signal meets the predetermined threshold.

8. A process for monitoring a pressure change within at least one compartment of an aircraft and operating a pyrotechnic device associated with a door latch, comprising:
arranging a door latch in an aircraft door that comprises a pyrotechnic actuator and a latch bolt;
configuring the pyrotechnic actuator to move and unlock the latch bolt when the pyrotechnic actuator is actuated;
generating a pressure signal corresponding to a pressure within a compartment of an aircraft with a pressure sensor;
receiving the pressure signal corresponding to the pressure within a compartment of an aircraft from the pressure sensor with a controller;
determining with the controller a decompression event based on the pressure signal corresponding to the pressure within a compartment of an aircraft from the pressure sensor;
generating a driver signal with an output driver to actuate the pyrotechnic actuator when the controller determines the decompression event based on the pressure signal corresponding to the pressure within the compartment of the aircraft from the pressure sensor;
configuring an electromechanical device to receive power and electromechanically move the latch bolt from a locked position to an unlocked position; and
configuring the electromechanical device to receive power and electromechanically move the latch bolt from an unlocked position to a locked position; and
configuring the pyrotechnic device to move the electromechanical device and the latch bolt when the pyrotechnic device is actuated.

9. The process of claim 8, further comprising:
configuring a flange to be connected to the latch bolt and to move the latch bolt in response to the pyrotechnic actuator being actuated.

10. The process of claim 8, further comprising:
configuring a latch housing to house at least the latch bolt; and
configuring a pressure chamber to be located within the latch housing, the pressure chamber operatively connected to the pyrotechnic actuator.

11. The process of claim 8, further comprising:
configuring a spring to be moved in response to the pyrotechnic actuator being actuated and the latch bolt being moved by an actuation of the pyrotechnic actuator; and
configuring the spring to return the latch bolt to a normal operating position after implementation of the pyrotechnic actuator.

12. The process of claim 8, further comprising:
configuring a housing to support the pyrotechnic actuator; and
configuring the housing to contact a flange that is connected to the latch bolt and configured to move the latch bolt in response to the pyrotechnic actuator being actuated.

13. The process of claim 8, further comprising:
configuring a latch housing to house at least the latch bolt;
configuring a pressure chamber to be located within the latch housing, the pressure chamber operatively connected to the pyrotechnic actuator;
configuring a spring to be moved in response to the pyrotechnic actuator being actuated and the latch bolt being moved by an actuation of the pyrotechnic actuator; and
configuring the spring to return the latch bolt to a normal operating position after implementation of the pyrotechnic actuator.

14. The process of claim 8, wherein
band pass filtering the pressure signal and generating a filtered pressure signal;
determining a change in the filtered pressure signal and generating a pressure change output signal corresponding to a change in pressure; and
determining whether the pressure change output signal meets a predetermined threshold and generating a threshold output signal indicating that a decompression event has occurred if the pressure change output signal meets the predetermined threshold.

* * * * *